United States Patent [19]

Feuerman

[11] Patent Number: 5,582,139
[45] Date of Patent: Dec. 10, 1996

[54] FUEL INJECTOR FOR A GASEOUS FUEL SUPPLY

[76] Inventor: Arnold I. Feuerman, 2901 Bridgewood La., Boca Raton, Fla. 33434

[21] Appl. No.: 385,653

[22] Filed: Feb. 8, 1995

[51] Int. Cl.[6] ................................. F02B 47/02
[52] U.S. Cl. .................... 123/25 C; 123/25 B; 123/25 F
[58] Field of Search ..................... 123/25 R, 25 A, 123/25 B, 25 C, 25 D, 25 F

[56] References Cited

U.S. PATENT DOCUMENTS

| | | |
|---|---|---|
| 3,968,775 | 7/1976 | Harpman ............................ 123/25 F |
| 4,011,843 | 3/1977 | Feuerman . |
| 4,133,847 | 1/1979 | Feuerman . |
| 4,141,323 | 2/1979 | Hart ................................... 123/25 B |
| 4,158,551 | 6/1979 | Feuerman . |
| 4,246,082 | 1/1981 | Feuerman . |
| 4,276,131 | 6/1981 | Feuerman . |
| 4,323,044 | 4/1982 | Erwin et al. ....................... 123/25 F |
| 4,412,512 | 11/1983 | Cottell ................................ 123/25 D |
| 4,594,991 | 6/1986 | Harvey .............................. 123/25 D |
| 4,632,083 | 12/1986 | Reggiani . |
| 4,637,352 | 1/1987 | Green ................................. 123/25 D |
| 5,010,868 | 4/1991 | Clements . |
| 5,012,772 | 5/1991 | Nakamura ......................... 123/25 D |
| 5,125,367 | 6/1992 | Ulrich et al. ..................... 123/25 F |
| 5,154,142 | 10/1992 | Kamo ................................ 123/25 B |
| 5,201,299 | 4/1993 | Kong . |
| 5,329,908 | 7/1994 | Tarr et al. . |

*Primary Examiner*—Erick R. Solis
*Attorney, Agent, or Firm*—Gifford, Krass, Groh, Sprinkle, Patmore, Anderson & Citkowski, P.C.

[57] ABSTRACT

A fuel system is provided for injecting gaseous fuel derived from an electrolytically conductive emulsion of gasoline and water into an internal combustion engine. The system includes a source of electrolytically conductive water hydrocarbon emulsion, means for vaporizing the emulsion, and means for feeding the gaseous vapor to a fuel injection system operative to inject a predetermined amount of gaseous fuel into each of the engine cylinders. An electronic control module is provided which controls the rate at which each fuel injector mixes air with the gaseous vapor and the rate at which the injectors inject the air/fuel mixture to the cylinders.

12 Claims, 1 Drawing Sheet

FUEL INJECTOR FOR A GASEOUS FUEL SUPPLY

BACKGROUND OF THE INVENTION

I. Field of the Invention

This invention relates generally to a fuel injection system, and more particularly to a method for injecting gaseous fuel derived from an electrolytically vaporized emulsion of gasoline and water into an internal combustion engine.

II. Description of the Relevant Art

I recognized some time ago a major shortcoming in the field of hydrocarbon fueled internal combustion engines. Much of the fuel was still in liquid form at the start of the combustion chamber explosion despite the fact that both the fuel economy of the engine and the cleanliness of its exhaust would be improved if the charge were in pure vapor form. Since only the vapor derived from the liquid hydrocarbon (usually gasoline) is explosive, any excess unburned hydrocarbon liquid in the combustion chamber substantially reduces the efficiency of the engine. Therefore, I realized that it would be advantageous to develop a fuel system in which the engine was powered by fuel in the gaseous state.

Through extensive research and development, I invented a unique liquid fuel composition and a novel arrangement for vaporizing that fuel to achieve a vapor fuel that would be provided directly to the combustion chamber. Engines fueled by vapor in accordance with my invention attained higher fuel efficiencies than did conventionally fueled engines. My invention was disclosed in various forms in my prior patents, U.S. Pat. Nos.: 4,011,843; 4,133,847; 4,158,551; 4,246,082; and 4,276,131.

One of my patents, U.S. Pat. No. 4,011,843 discloses a vaporized fuel for an internal combustion engine and a method and apparatus for producing the same. I found that conventional hydrocarbon fuels such as gasoline could not be vaporized even with the addition of electrolytes, since electrolytes did not homogeneously mix with gasoline. However, the addition of appropriate electrolytes to certain water-hydrocarbon emulsions produced liquid fuel that could be vaporized through the passage of electric current to produce vapor charges containing both hydrocarbons and water. The particular composition of liquid fuel broadly consisted of water-hydrocarbon emulsions with added electrolytes and proved highly stable over all operating conditions. The increases in fuel economy which resulted from the vaporized state of the fuel charge and the presence of water vapor and free hydrogen in the fuel charge outweighed the energy consumption of the system vaporizing the fuel, thus increasing the fuel economy of engines fueled in accordance with my invention.

I first developed my vaporized fuel system for a carburetor based engine. Thus, once the fuel was vaporized, it was provided to a carburetor which mixed the vapor with incoming air and provided an explosive charge to the input valves of the engine cylinders. The carburetor was controlled by an accelerator which controlled the charge flow to the cylinders and thus the speed of the engine. Unfortunately, some of the characteristics of a carburetor based system did not work well with my invention.

Recently, it has become well-known that fuel injection systems offer much greater efficiency than carburetor-based systems since the input of fuel to the cylinders may be precisely controlled. Modern fuel injection systems are generally divided into two classifications. Throttle body fuel injection (TBI) systems use a central injection point with one or two injectors for all of the engine's cylinders. Multiport fuel injection (MPI) systems feature an injector at each cylinder port. Both TBI and MPI systems inject carefully metered bursts of fuel into the engine. MPI systems offer substantial advantages over TBI systems and are typically favored in today's engines.

The great majority of fuel injectors in use today are designed for injecting liquid fuels to the combustion chamber. Fuel in the gaseous state exhibits a much lower density than liquid fuels. Therefore, gaseous fuels must be delivered to the engine at volume flow rates significantly higher than liquid fuels. Further, the flow rate of a gaseous fuel must be precisely controlled to achieve proper engine performance, low exhaust emissions, and good fuel economy. Existing carburetors and fuel injectors designed for liquid fuels are not capable of delivering gaseous fuels at the required flow rates, and with the needed degree of precision.

Gaseous fuel injection systems are known. For example, U.S. Pat. No. 5,201,299 issued to Kong, discloses a rotary gaseous fuel injector for injecting gaseous fuel into an internal combustion engine. U.S. Pat. No. 5,329,908 issued to Tarr discloses a natural gas injection system for gaseous fueled engines.

However, I am not aware of previous fuel injection systems in which the fuel is liquid at ambient temperatures and pressures and is vaporized and then injected into the cylinders of an internal combustion engine.

SUMMARY OF THE PRESENT INVENTION

The present invention broadly contemplates achieving the advantages provided by utilizing a fuel system in which an electrolytic emulsion of gasoline and water is vaporized and then injected directly to the combustion chamber at a precisely controlled rate.

The above advantages and others are obtained in accordance with the preferred embodiment by utilizing a fuel system combining the benefits of a fuel source consisting of an electrolytically conductive hydrocarbon emulsion with a plurality of fuel injectors. The electrolytically conductive fuel source used with the invention preferably contains not more than one-third by volume of water. I have determined that about 2% to 3% by volume of water is required in the emulsion to attain a vaporizable liquid. The emulsion is achieved through the use of relatively small quantities of surfactants. The electrolyte is preferably chosen from the group of mono-basic alkali metal organic compounds having an alkyl-allyl radical. These compounds are preferably modified by the addition of a base such as sodium hydroxide, to attain an alkaline nature. Other additives, such as dispersants, antiicers, anti-rust agents and the like may be combined with the emulsion. The dispersants act to prevent agglomeration of the electrolytes, to promote emulsion and to lower the viscosity. The inventive fuel could also be formed by mixing an additive containing the surfactants and electrolyte, and water, with gasoline in a fuel tank.

The liquid fuel is first pumped to a vaporizer by a conventional fuel pump. The pump is driven by the engine and provides a stream of fluid from the fuel tank to the vaporizer. The vaporizer passes electric current through fluid to form a vapor. The resulting vapor includes the vapor from the hydrocarbon, water vapor, and may also contain some proportions of molecular hydrogen and oxygen resulting from the electrolytic decomposition of the water and hydrocarbons. The passage of current through the liquid fuel to produce vapor is achieved using a vaporizer of special construction employing closely spaced plates. The vaporizer is highly efficient both in terms of utilization of electricity and the current can readily be adjusted to control the rate of vapor generation in response to the engine's fuel requirements.

The vapor formed from the fuel is then fed to a pressurizer which is preset to maintain a predetermined pressure. The pressurizer also includes a heating chamber that responds to low ambient temperatures by heating the vapor to ensure that the vapor remains in the gaseous state. Upon acceleration by the user, an electronic control module signals a pressurizer valve to open and force gas into a plurality of fuel injectors.

BRIEF DESCRIPTION OF THE DRAWINGS

Other objectives, advantages and applications of the present invention will be made apparent by the following detailed description of a preferred embodiment of the invention. The description makes reference to the accompanying drawings, in which.

DETAILED DESCRIPTION OF A PREFERRED EMBODIMENT OF THE PRESENT INVENTION

Figure 1:
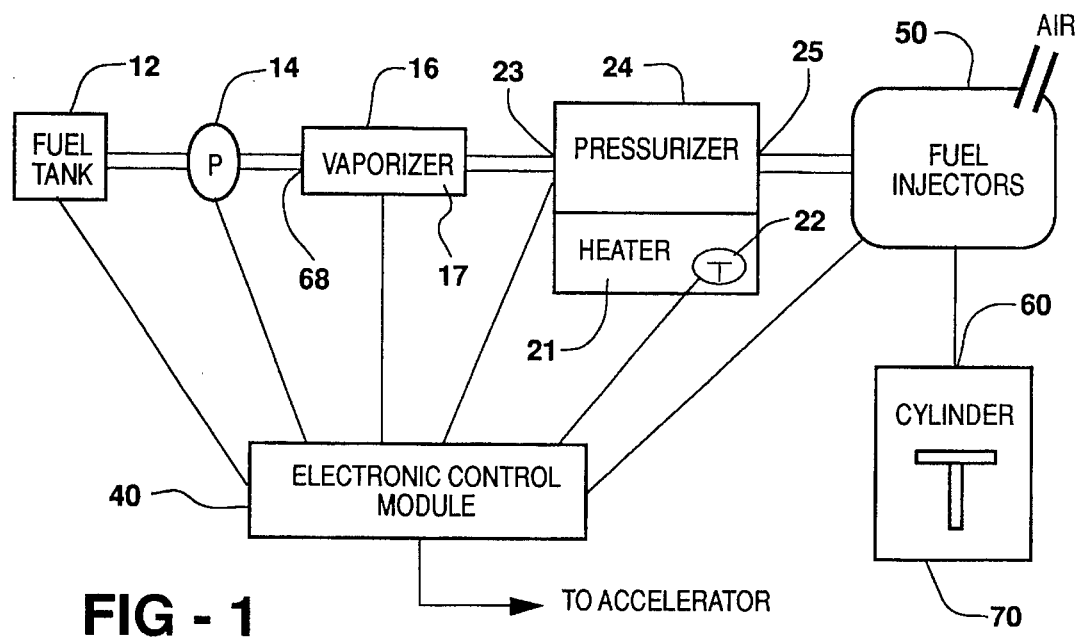
FIG. 1 is a schematic block diagram illustrating the fuel system for an internal combustion engine in accordance with the present invention.

In FIG. 1, a schematic block diagram of the fuel system of the present invention is shown. The fuel supply for the engine, stored in the tank 12, broadly comprises a water-gasoline emulsion. The water is preferably present in percentages by volume of less than about one-third and in excess of 2 to 3% by volume. Approximately 26% water appears to provide optimum engine performance in a conventional automotive engine. I preferably employ fuels of the following composition in connection with the invention:

EXAMPLE 1

| | |
|---|---|
| .60% | by volume of butyl naphthalene sodium sulfonate (BNS, by Emkay, anionic, modified by sodium hydroxide) |
| .60% | by volume of modified sodium sulfonate (No. 98, by Petrochem, anionic, dispersant) |
| .60% | by volume of alcohol sodium sulfate (Rexowet NF, by Emkay, anionic) |
| .60% | by volume of alkyl terpene (B, by Emkay, non-ionic) |
| 25.60% | by volume of tap water |
| 72.00% | by volume of commercially available gasoline |
| 100.00% | |

The alkyl terpene and the alcohol sodium sulfate form the basic surfactant system for emulsifying the water and the gasoline. These surfactants provide a proper hydrophobic-hydrophilic balance and provide an emulsion having a higher viscosity than the gasoline which is well suited for use with the preferred embodiments of the vaporizer.

The dispersant is commonly employed with surfactant systems and produces a smooth homogeneous emulsion, preventing agglomeration of the components of the emulsion. The modified sodium sulfate is a water solution containing two grams of the sodium sulfate per 100 milliliters of water.

The butyl naphthalene sodium sulfonate acts as an electrolyte. It is modified by the addition of sodium hydroxide to provide a basic Ph. It is a member of the class of organic materials known as the mahogany acids. Other mono-basic sulfonates might be employed with other embodiments of the invention and as a broad class any organic alkaline metal compound that is soluble in the emulsion can be used as an electrolyte.

The volume of tap water in the above formula may be varied from 3 to 33% and the balance of the gasoline adjusted accordingly without varying the other chemical constituents. Any of these fuels provide satisfactory results. Anti-icers, corrosion resistant agents and other additives known to the art may be added as conditions warrant.

To combine the ingredients of the above formula the surfactants are first introduced into the water phase and the gasoline is then added by continuously stirring with an air driven mixing motor at 1,000 r.p.m. for 3–10 minutes. It is important that as little air as possible be entrained in this emulsion as the thicker mass will require higher pressure for pumping and air bubbles cause an intermittent fuel flow.

This emulsion remains stable over long periods with no separation at extremes of temperature and will not freeze if commonly used gasoline de-icers are used.

EXAMPLE 2

| | |
|---|---|
| .60% | by volume of butyl naphthalene potassium sulfonate |
| .60% | by volume of modified potassium sulfonate |
| .60% | by volume of alcohol potassium sulfonate |
| .60% | by volume of alkyl terpene |
| 2.80% | by volume of butyl ether (Butyl Cellusolve by Union Carbide) |
| 2.80% | by volume of alkynolamide (Calamide C by Pilot Chemical Co.) |
| 1.00% | by volume of ethylene oxide condensate (Macon 4 by Stepan Chemical Co.) |
| 24.00% | by volume of tap water |
| 67.00% | by volume of commercially available gasoline |
| 100.00% | |

The butyl ether acts as a solvent to provide the emulsion with a lower viscosity. I have found that the lower the viscosity of the water-fuel emulsion, the more easily the manifold pressure acts to draw the fluid into the vaporizer, without the need for pumping, thereby achieving a flow which varies in direct proportion to the engine demand.

Similarly, the ethylene oxide condensate acts as a thinner and the alkynolamide acts as an emulsifier.

The emulsion is best formed by mixing the chemicals with either the gasoline or the water and then mixing in the other component. That is, if the chemicals are first added to the gasoline, the mixture of the chemicals and gasoline is then added to the water, or vice versa.

The following formula represents an additive intended to be mixed with water and gasoline to form a fuel for use in connection with the present invention.

EXAMPLE 3

| | |
|---|---|
| 16.00% | by volume of alcohol sodium sulfate (Rexowet NF, by Emkay, anionic) |
| 35.00% | by volume of alkanolamine, super (Witcamide 82, by Witco Chemical Company) |
| 20.00% | by volume of a solvent emulsifier blend (Schercomul F, by Scherer Chemical Company) |
| 25.00% | by volume of butyl ether (Butyl Cellusolve, by Union Carbide) |
| .67% | by volume of alkyl terpene (B, by Emkay, nonionic) |
| .67% | by volume of butyl naphthalene sodium sulfonate (BNS, by Emkay, anionic, modified by sodium hydroxide) |
| .66% | by volume of modified sodium sulfonate (98 by Petrochem, anionic, dispersant) |
| 2.00% | by volume of tap water |
| 100.00% | |

10% by volume of this additive is used with 65% by volume of gasoline and 25% by volume of water to form an electrolytic water-gasoline emulsion for use in connection with the present invention.

As shown in FIG. 1, after the appropriate fuel is injected into the tank 12, a pump 14, driven by the engine and controlled by an electronic control module 40, provides a stream of fluid from the tank 12 to a vaporizer 16. As in conventional automobile engines, the pump is preferably of the positive displacement type and produces an output flow proportional to the engine speed.

The vaporizer 16 passes electric current through the fluid provided by the pump 14 to form a fuel vapor. The current passed through the vaporizer 16 and the resultant rate of generation of the vapor is controlled by the electronic control module 40 which will be discussed further below.

Figure 2:
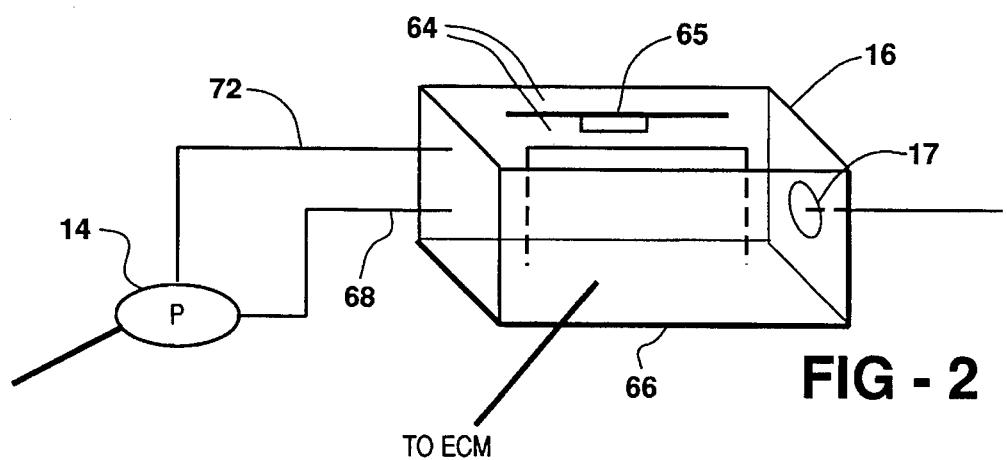
FIG. 2 is a schematic drawing of the vaporizer and means for feeding fuel to the vaporizer.

A preferred form of the vaporizer is illustrated in FIG. 2. The vaporizer employs a pair of metal plates 64, which are disposed parallel to one another and separated by approximately 1/16 of an inch by plastic spacers 65 therebetween. The plates are supported relative to one another and enclosed at their free ends, by a plastic housing 66, shown broken away for purposes of illustration, which surrounds the outer sides of the plates and encloses the volume between them. Liquid fuel to be vaporized is introduced to the space between the plates by a feedline 68 that extends through the side casing 66 adjacent to the bottom of one side wall. The fuel is driven through the feedline 68 by the pump 14 connected by an input line to the fuel tank 12.

A liquid level sensor 72 extends into the volume between the plates 64 through the sidewall 66, about halfway up its height. The sensor may take any one of a variety of forms. It might be a solid-state sensor or it might employ float or other well-known techniques. The electrolyte in the gasoline allows the use of a conductive liquid level sensor, which could not be employed with conventional gasoline fuel. The sensor 72 is connected to the pump 14 and controls the application of power to the pump 14 to maintain a constant level of liquid fuel volume between the plates 64.

The vapor generated between the plates 64 as a result of passage of electric current through the fluid fuel accumulates in the volume above the fluid interface and the pressure of the vapor forces it through output valve 17. The electric current used with the vaporizer of the present invention may be either alternating current or direct current. The direct current is believed to cause a higher degree of dissociation of the water than alternating current but also requires substantially higher currents.

Upon vaporization, the gaseous fuel will be at a low pressure such as 10 psi. Since the gaseous fuel necessarily exhibits a lower density than liquid fuels, it is next necessary to pressurize the gaseous fuel such that it can be delivered to the engine at the necessary volume rates. It is also important that the gaseous fuel generated in the vaporizer does not condense back into the liquid state. While the preferred embodiment of the invention utilizes the forms of vaporizers shown, it should be recognized that other forms of vaporizers may be used as recognized by those of ordinary skill in the art.

A pressurizer 24 is provided which receives the gaseous fuel from the vaporizer 16. The pressurizer 24 pressurizes the gaseous fuel to a predetermined level such that the gas maintains a high pressure such as 200 psi and does not condense. A heating element 21 is electrically connected to the pressurizer 24 to ensure that the temperature of the gaseous fuel does not drop to the point that the gaseous fuel recondenses. A conventional thermostat 22 regulates the temperature inside the pressurizer and activates the heating unit 21 should it be necessary.

Figure 3:
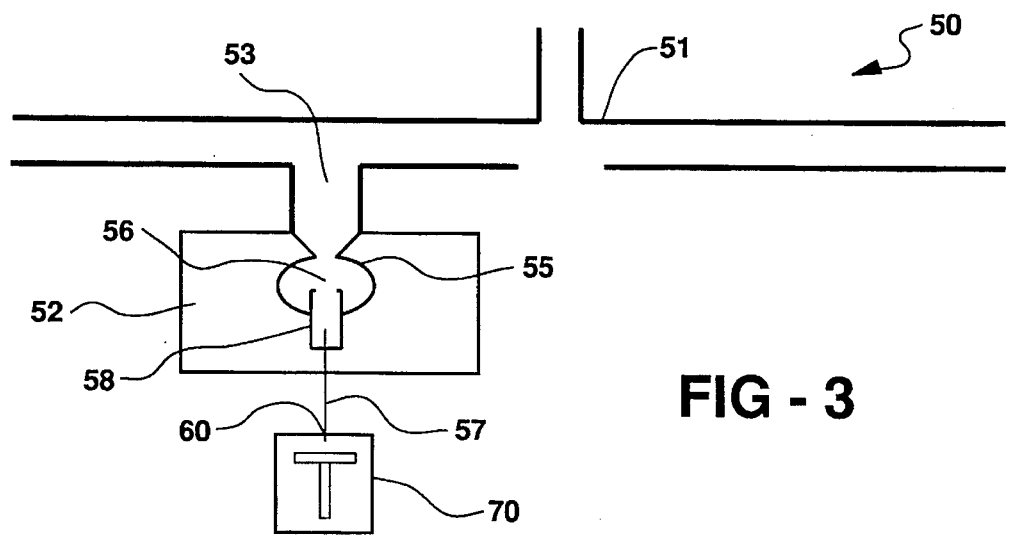
FIG. 3 is a sectional view through the fuel injector system of the present invention.

The gaseous fuel from the pressurizer 24 is then fed to a plurality of fuel injectors 50, each coupled to the input valve 60 of its respective cylinder 70. As shown in FIG. 3, each fuel injector 50 has an injector body 52, an inlet port 53 connected to the fuel supply conduit 51, a pressurized accumulator 55 preferably containing at least several times the maximum amount of fuel which would have to be injectable thereby, and an injector valve 57 for movement between a first position blocking the flow of gaseous fuel to the combustion chamber and a second position permitting the flow of fuel therethrough. For efficient operation, the accumulator 55 preferably should maintain gas supply pressure of at least 2,000 psi. Although the present description of the fuel injectors 50 utilizes an MPI fuel injector system in the preferred embodiment, a different fuel injection system such as a TBI system may also be incorporated into the present invention. Modifications and variations of the present invention will readily occur to those skilled in the art.

The overall operation of the fuel system of the present invention is controlled by the electronic control module (ECM) 40. The ECM 40 insures that the proper quantity of gas will be injected for the particular set of operating conditions existing at any point in time. The ECM 40 receives indications from sensors on the fuel tank 12, fuel pump 14, vaporizer 16, thermostat 22, and pressurizer 24 concerning the state of the fuel supply. The ECM 40 then outputs appropriate signals to the fuel injectors 50 such that injector valve 57 moves to its second position and a precise amount of gaseous fuel is injected to the engine cylinder 70.

In operation of the fuel injection system of the present invention, the fuel must first be vaporized. As noted previously, the fuel used with the engine basically consists of an electrolytically conductive water-gasoline emulsion. The water-gasoline emulsion is vaporized initially upon start of the engine. In this manner, the output of the vaporizer 16 and the rate of generation of vapor will both be a function of the engine speed. Upon vaporization, the gaseous fuel is fed to the pressurizer 24 which compresses the gas to a desired pressure and ensures that the pressurized gas does not condense. The pressurized gas is then transferred to a fuel supply rail 51. Gaseous fuel from the fuel supply rail 51 enters each of the injectors 50 via an intake port 53 and flows into a pressurized accumulator 55. The accumulator 55 has a volume which is preferably at least ten times as large as that of the largest charge which would be injected into the engine cylinder 70.

The gaseous fuel in the accumulator 55 is repressurized and is ready to be injected into the engine cylinder 70. The control module 40 determines the appropriate quantity of fuel to be injected as well as the time that the injector valve 57 is open. A passage 56 connects the accumulator 55 with a discharge chamber 58 from which gaseous fuel may be injected upon opening of valve 57. The opening and closing of valve 57 is controlled by the ECM 40 such that the amount of gaseous vapor injected into the engine cylinder 70 may be precisely controlled. The quantity of gaseous fuel injected is a function of the pressure of the gas and the time that the injector valve 57 is open.

As will be apparent to one of ordinary skill in the art, the present invention may be varied in accordance with a particular application in which the invention finds usage. Therefore, this invention is not limited to the single embodiment described heretofore, and modifications and improvements can be made thereto without leaving the scope of the invention.

Having thus described my invention, I claim:

1. A fuel system for an internal combustion engine having a plurality of cylinders, comprising:

a source of electrolytically conductive water hydrocarbon emulsion;

means for passing an electric current through said emulsion to generate a gaseous vapor;

means for pressurizing said gaseous vapor; and means for feeding said pressurized gaseous vapor to a fuel injection system operative to inject a predetermined amount of said gaseous fuel into each of said plurality of cylinders.

2. The fuel system of claim 1, further comprising means for controlling the quantity of fuel gas injected into the engine cylinders by said fuel injection system and the time at which it is injected relative to a cycle of operation of the engine cylinder.

3. The fuel system of claim 2, further comprising means for sensing the temperature of the gaseous vapor and maintaining the gaseous vapor at a predetermined temperature.

4. The fuel system of claim 3, wherein the means for sensing the temperature of the gaseous vapor comprises a thermostat.

5. The fuel system of claim 3, wherein the means for maintaining the gaseous vapor at a predetermined temperature comprises a heating unit.

6. The fuel system of claim 1, wherein the fuel injection system further comprises a plurality of fuel injectors, each injector comprising:

a fuel injector body;

an accumulator contained within said body;

an inlet valve for controlling the input of gaseous fuel into said accumulator; and means for injecting the gaseous fuel from the accumulator to an engine cylinder.

7. In a fuel system having a fuel supply including a source of electrolytically conductive water hydrocarbon emulsion and means for passing an electric current through said emulsion to generate a gaseous vapor from the emulsion for an internal combustion engine having a plurality of cylinders, the improvement comprising:

means for pressurizing said gaseous vapor;

means for injecting the pressurized gaseous vapor into a plurality of cylinders; and means for controlling the quantity of pressurized gaseous vapor injected into the cylinders.

8. The fuel system of claim 7, wherein the means for injecting the gaseous vapor comprises a plurality of fuel injectors.

9. The fuel system of claim 8, wherein the fuel injectors further comprise a fuel injector body, an accumulator contained within the body for receiving and storing gaseous vapor, an inlet valve for controlling the input of gaseous fuel into said accumulator and means for injecting the gaseous fuel to an engine cylinder.

10. The fuel injection system of claim 7, wherein said means for controlling the quantity of fuel gas injected into the engine cylinders further comprises an electronic control module.

11. A method for injecting gaseous fuel into an internal combustion engine including the steps of:

passing an electric current through an electrolytically conductive water-hydrocarbon emulsion to form a gas;

pressurizing said gas;

inputting the pressurized gas to a plurality of fuel injectors; and injecting the pressurized gas to a plurality of cylinders.

12. The method of claim 11 further comprising the step of controlling the injection of gas from the fuel injectors to the cylinders.

\* \* \* \* \*